(12) United States Patent
Pai et al.

(10) Patent No.: US 7,016,428 B1
(45) Date of Patent: Mar. 21, 2006

(54) METHODS OF EFFICIENT IMPLEMENTATION OF TRELLIS BASED SPECTRAL SHAPING WITH LOOKAHEAD

(75) Inventors: Pratima Pai, Singapore (SG); Godfrey Da Costa, Singapore (SG)

(73) Assignee: STMicroelectronics Asia Pacific PTE Ltd., Singapore (SG)

( * ) Notice: Subject to any disclaimer, the term of this patent is extended or adjusted under 35 U.S.C. 154(b) by 0 days.

(21) Appl. No.: 09/831,855

(22) PCT Filed: Nov. 14, 1998

(86) PCT No.: PCT/SG98/00094

§ 371 (c)(1),
(2), (4) Date: Aug. 23, 2001

(87) PCT Pub. No.: WO00/30311

PCT Pub. Date: May 25, 2000

(51) Int. Cl.
*H04L 27/28* (2006.01)
*H04L 23/02* (2006.01)

(52) U.S. Cl. .................. 375/265; 714/792; 714/796
(58) Field of Classification Search ............ 375/219, 375/259, 295, 265, 141, 146, 222, 241, 242, 375/246, 253; 714/792, 794, 795, 796
See application file for complete search history.

(56) References Cited

U.S. PATENT DOCUMENTS

| | | | |
|---|---|---|---|
| 4,831,635 A | 5/1989 | Lee, deceased et al. | 375/19 |
| 4,901,331 A | 2/1990 | Calderbank et al. | 375/39 |
| 4,980,897 A | 12/1990 | Decker et al. | 375/38 |
| 5,257,272 A | 10/1993 | Fredrickson | 371/43 |
| 5,548,600 A | 8/1996 | Fredrickson et al. | 371/43 |
| 5,740,203 A | 4/1998 | Ramaswamy et al. | 375/341 |
| 5,818,879 A | 10/1998 | Eyuboglu et al. | 375/286 |
| 5,892,801 A * | 4/1999 | Schneider | 375/348 |
| 6,061,407 A * | 5/2000 | Cherubini et al. | 375/265 |

FOREIGN PATENT DOCUMENTS

WO    WO 98/45970    * 10/1998

* cited by examiner

*Primary Examiner*—Jean B. Corrielus
(74) *Attorney, Agent, or Firm*—Lisa K. Jorgenson; E. Russell Tarleton; Seed IP Law Group PLLC

(57) ABSTRACT

A method and apparatus for efficient implementation of a frame-based trellis spectral shaping with a variable lookahead depth that reduces memory and computational requirements that includes a data encoder for generating spectrally-shaped coded data according to a trellis coding system, a metric computation and trellis engine, and a processing circuit to apply a selected coding strategy to data frames to generate spectrally-shaped coded data form transmission.

15 Claims, 3 Drawing Sheets

METHODS OF EFFICIENT IMPLEMENTATION OF TRELLIS BASED SPECTRAL SHAPING WITH LOOKAHEAD

CROSS-REFERENCE TO RELATED APPLICATION

This application is a National Stage of International Application No. PCT/SG98/00094, filed Nov. 14, 1998, which application is incorporated herein by reference in its entirety.

FIELD OF THE INVENTION

This invention relates to systems and methods for spectral shaping of signals in communications systems, and it is particularly applicable to data communication equipment like a modem.

BACKGROUND OF THE INVENTION

In digital communications it is sometimes desirable to avoid transmission at certain Frequencies in the transmission spectrum. It is usually necessary to do so in order to avoid undesirable distortion which might result if communications signals use certain frequency components. The presence of such distortion can lead to unnecessary performance degradation.

To avoid transmission at the undesirable frequencies in the spectrum it is necessary to shape the transmission spectrum of the transmitted signals accordingly. The principles of spectral shaping are conveniently described, for example, in U.S. Pat. No. 5,818,879, entitled "Device, System and Method for Spectrally Shaping Transmitted Data Signals". Previously proposed schemes for spectral shaping achieve the desired result by the use of redundancy. One such scheme is the trellis based spectral shaping which has been proposed for the V.90 standard to be ratified by the ITU-T International Telecommunication Union: 'A digital modern and analogue modem pair for use on the public switched telephone network (PSTN) at data signalling rates of up to 56 000 bit/s downstream and up to 33 600 bit/s upstream' ITU-T recommendation V.90, September 1998, Geneva, Switzerland. This scheme uses a convolutional code with two states and provides significant gain.

SUMMARY OF THE INVENTION

A straightforward M-ary tree implementation conventionally requires a start-up phase and a steady-state phase, increasing the complexity. In one aspect of the present invention pre-determined state transitions according to a valid trellis path are assumed during the start-up phase. The performance penalty for small look-ahead depth is insignificant and deviation if present is for a very short duration.

In accordance with an embodiment of the present invention, there is provided a method of coding digital data for transmission according to a trellis coding system having a predetermined number of (N) states and a predetermined number of (M) state transitions from each state, wherein the data is arranged in a series of frames, a state is associated with each frame to determine a coding strategy for the frame, and a look-ahead depth (D) representing a number of data frames is selected, including:

assigning an initial state for a first frame of the series of data frames, and assigning states for the subsequent data frames in the series of data frames up to the look-ahead depth according to a predetermined valid trellis path, the method further including:

sequentially fetching subsequent data frames in the series and determining respective states therefor based on a path metric for state transitions computed over the number of frames represented by the look-ahead depth; and coding the data frames for transmission according to the coding strategies corresponding to the states assigned or determined for the frames, wherein the series of data frames are coded for a shaped spectrum upon transmission thereof.

The present invention also provides a data encoder for generating spectrally-shaped coded data according to a trellis coding system, wherein the data is arranged in a series of data frames from a data source and a trellis state is associated with each data frame such that a coding scheme for each frame may be determined on the basis of transitions of states for frames over a selected look-ahead depth (D), comprising:

a buffer memory coupled to the data source for buffering data frames in the series of data frames by the selected look-ahead depth (D);

a metric computation and trellis extension engine coupled to sequentially receive said data frames from the data source and determine node information in a plurality of nodes for each said frame representing possible states, state transitions from a preceding frame and path metrics for the state transitions;

a current state storage coupled to the metric computation and trellis extension engine for storing the state of a current frame in the series of data frames;

a node memory coupled to the metric computation and trellis extension engine for storing said node information for nodes of a frame succeeding the current frame by the look-ahead depth;

a coding scheme memory for storing a correlation between state transitions and respective coding schemes; and a processing circuit coupled to the coding scheme memory and metric computation and trellis extension engine for applying a selected coding scheme to a data frame to generate spectrally shaped coded data;

wherein said metric computation and trellis extension engine determines the selected coding scheme for the current frame according to the state stored in the current state storage and a node for the frame succeeding the current frame by the look-ahead depth which is selected on the basis of the path metric for the node, including:

the metric computation and trellis extension engine assigning an initial state for a first frame of the series of data frames, and assigning states for the subsequent data frames in the series of data frames up to the look-ahead depth according to a predetermined valid trellis path.

In one embodiment of the present invention, the start-up phase and the steady state are unified. The trellis shaper chooses a predetermined valid trellis path during the start-up phase irrespective of the criterion for selection of the sub-tree. Once in the steady state, it uses the selection criterion to select the state transition.

The trellis shaping function of this embodiment is implemented with a linear structure that requires memory for only the nodes at level D of the binary tree. In the steady state phase, for each input spectral shaper frame $X_{i+D}$ the preferred embodiment computes the path metric associated with each of the $M^{D+1}$ paths. The node at level D+1 which satisfies the selection criterion is then chosen as the best path. The state transition from the current root node and the subsequent root node is determined by the current trellis state and the best path.

This implementation provides a significant reduction in computation and memory requirements, and the performance penalty as a result is insignificant.

BRIEF DESCRIPTION OF THE DRAWINGS

The invention is described in greater detail hereinbelow, by way of example only, through description of preferred embodiments and with reference to the accompanying drawings, wherein.

DETAILED DESCRIPTION OF THE PREFERRED EMBODIMENTS

Figure 4:
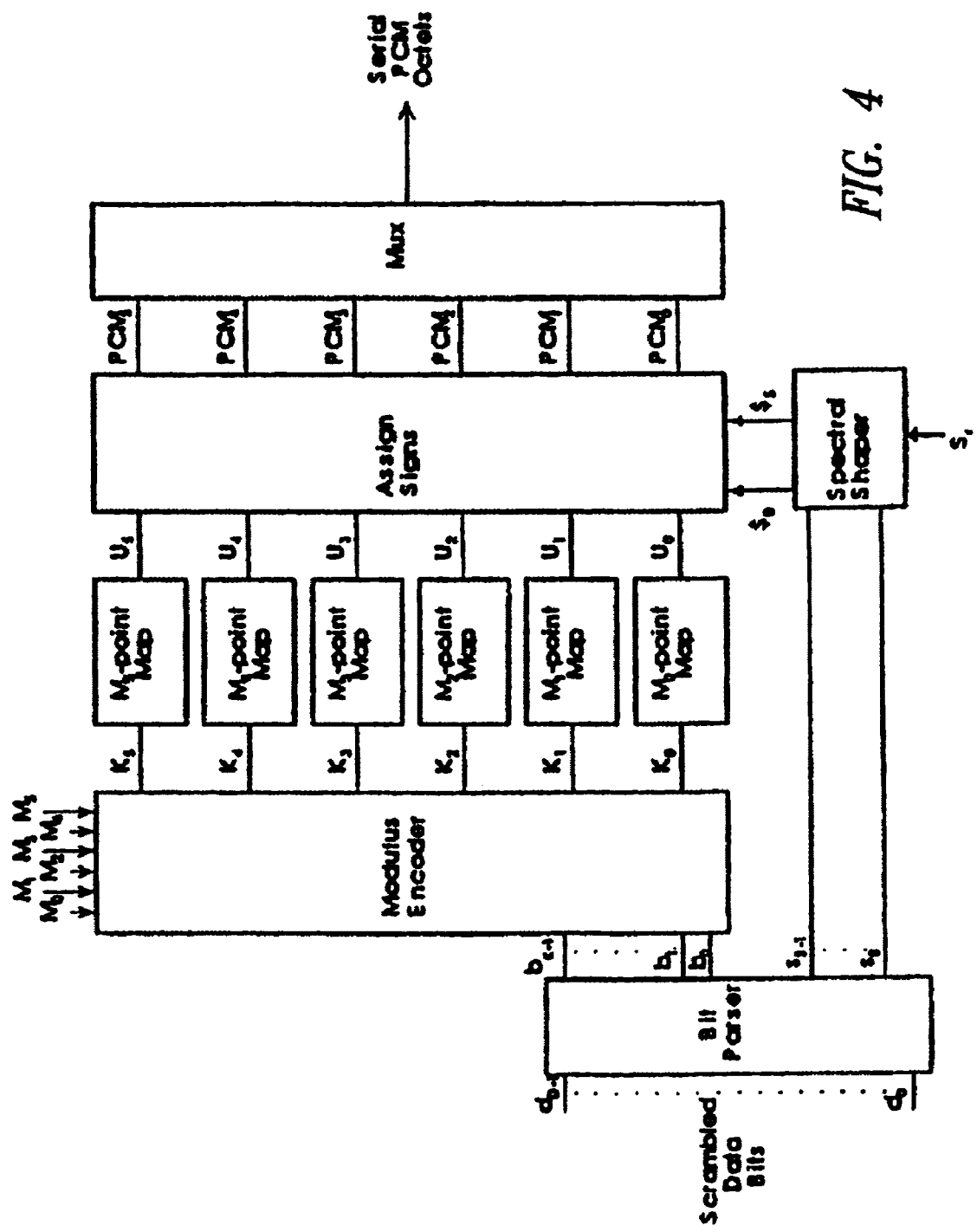
FIG. 4 is a block diagram of an encoder for use in a modem or the like in which embodiments of the present invention may be implemented.

By way of background, FIG. 4 is a block diagram which illustrates an overview of an encoder for use in a digital modem or the like, and represents one data frame. In the following description, data frames in the digital modem have a six-symbol structure. Each symbol position within the data frame is called a data frame interval and is indicated by a cyclic time index, i=0 . . . , 5. Frame synchronisation between the digital modem transmitter and an analogue modem receiver is established during training procedures.

Mapping parameters for the encoder, established during training or rate renegotiation procedures, are:

(i) six PCM code sets, one for each data frame interval 0 to 5, where data frame interval i has $M_i$ members;

(ii) K, the number of modulus encoder input data bits per data frame;

(iii) $S_R$ the number of PCM code sign bits per data frame used as redundancy for spectral shaping; and (iv) $S_R$ the number of input data bits for the spectral shaping scheme, where $S+S_F=6_F$ define the six PCM code sign bits according to a sign assignment procedure.

The encoder 10 illustrated in FIG. 4 includes a bit parser 12 which receives D (equal to S+K) serial input data bits $d_0$ to $d_{D-1}$, and is coupled to a modulus encoder 14 and a spectral shaper 22. The input data bits $d_0$ to $d_{D-1}$ (where $d_0$ is first in time) are parsed into S sign input bits and K modulus encoder bits. The data bits $d_0$ to $d_{S-1}$ form $s_0$ to $s_{S-1}$, and $d_S$ to $d_{D-1}$ form $b_0$ to $b_{K-1}$.

K bits enter the modulus encoder 14. Additionally, there are six independent mapping moduli, $M_0$ to $M_5$, which are the number of members in the PCM code sets defined for data frame interval 0 to data frame interval 5, respectively. The modulus encoder 14 converts K bits into six numbers, $K_0$ to $K_5$, using the following algorithm which is specified in the aforementioned proposed standard:

1. Represent the incoming K bits as an integer, $R_0$:

$$R_0 = b_0 + b_1 * 2^1 + b_2 * 2^2 + \ldots + b_{K-1} * 2^{K-1}$$

2. Divide $R_0$ by $M_0$. The remainder of this division gives $K_0$, the quotient becomes $R_1$ for use in the calculation for the next data frame interval. Continue for the remaining give data frame intervals. This gives $K_0$ to $K_5$ as:

$$K_i = R_i \text{ modulo } M_i, \text{ where } 0 \leq K_i < M_i; R_{i+1} = (R_i - K_i)/M_i$$

3. The numbers $K_0, \ldots, K_5$ are the output of the modulus encoder, where $K_0$ corresponds to data frame interval 0 and $K_5$ corresponds to data frame interval 5.

The modulus encoder 14 is coupled to six independent mappers 16 associated with the six data frame intervals. Each mapper is a tabulation of $M_i$ PCM codes (corresponding to positive analogue values) that make up the constellation points of data from interval i. The PCM codes to be used in each data frame interval are specified by the analogue modem during training procedures. Each mapper 16 receives the quantities $K_i$ from the modulus encoder 14 and forms Ucode values $U_i$ by choosing the constellation point labelled by $K_i$.

Spectral shaping carried out according to the aforementioned standard by the spectral shaper 22 only affects the sign bits of transmitted PCM symbols. In every data frame of 6 symbol intervals, $S_r$ sign bits are used as redundancy for spectral shaping while the remaining S sign bits carry user information. The redundancy, $S_r$ is specified by the analogue modem during training procedures and can be 0, 1, 2, or 3. When $S_r=0$, spectral shaping is disabled.

The spectral shaper operates on a spectral shaper frame basis. For the cases $S_r=2$ and $S_r=3$, there are multiple shaper frames per six-symbol data frame. Spectral shaper operation for each shaper frame within a data frame (herein referred to as a shaping frame j) is identical except that they affect different data frame PCM sign bits. In particular, the spectral shaper modifies initial sign bits to corresponding PCM code sign bits ($S_0$, $S_1$ . . . ) without violating the constraint described below, so as to optimize a spectral metric.

Figure 1:
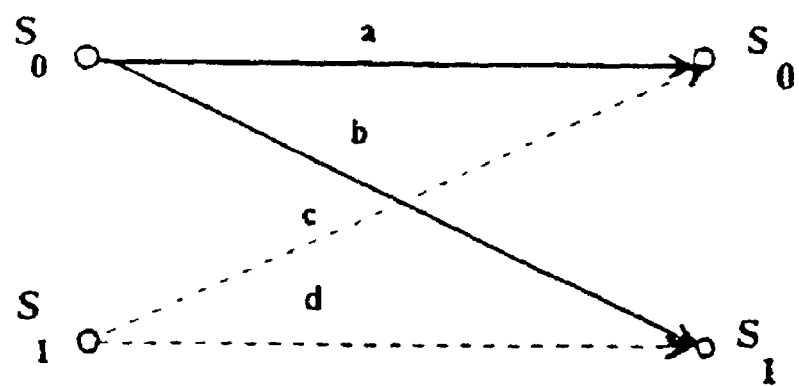
FIG. 1 is an exemplary state diagram of a two state trellis spectral shaping code.

The constraint of the spectral shaper can be described by way of a 2-state trellis diagram, such as that shown in FIG. 1. In a given spectral shaping frame i, the spectral shaper modifies the initial sign sequence according to one of the following four sign inversion rules:

Rule A: Do nothing;
Rule B: invert all sign bits in the spectral shaping frame;
Rule C: invert odd-numbered sign bits in the spectral shaping frame;
Rule D: Invert even-numbered sign bits in the spectral shaping fame.

The trellis diagram describes the sequence of sign inversion rules that are allowable. For example, when the spectral shaper is in state $S_0$ at the beginning of frame i, only rules A and B are allowable in that frame. The current state together with the sign inversion rule selected for the frame determine the next state according to the trellis diagram.

A look-ahead depth parameter D may be an integer between 0 and 3, for example, selected by the analogue receiving modem during training procedures. Look-ahead depths of 0 and 1 are mandatory in the digital modem according to the aforementioned standard, whereas look-ahead depths of 2 and 3 are optional. To select the sign inversion rule for the $i^{th}$ spectral shaping frame, the spectral shaper uses the PCM symbol magnitudes produced by the mapper 16 for spectral shaping frames i, i+1, . . . , i+D. The spectral metric that would result from each of the allowable sequences of sign inversion rules for frames i through i+D, starting from the current state, is then computed. Based on those computations, the spectral shaper then selects the sign inversion rule for frame i that minimizes the spectral metric, which is defined as the sum of the squares of the RFS up to and including the final symbol of spectral shaping frame i+D. The selection thus determines the next state of the system. The spectral shaper then sets the PCM code signs for shaping frame according to the selected sign inversion rule.

A trellis based spectral shaping scheme in an embodiment of the present invention uses a trellis code with N states and M state transitions from each state (M, N positive integers). Performance gain is achieved by using larger redundancy and increasing the look-ahead depth. Trellis based spectral shaping is usually implemented using M-ary trees. The information to be spectrally shaped is assumed to be framed and is hereafter referred to as the spectral shaper frame. The size of the spectral shaper frame varies to accommodate additionally redundancy bits. The spectral frame size and the look-ahead depth D being variables, the complexity of implementation of the spectral shaping technique increases. An implementation scheme which deals with all the cases uniformly is desired to make it computationally efficient. The memory requirements for the scheme should also be kept as small as possible.

The trellis state diagram for the two state trellis is as shown in FIG. 1, having two states $S_0$ and $S_1$. The state transitions are labelled a, b, c and d and associated with state transitions $S_0$->$S_0$, $S_0$->$S_1$, $S_1$->$S_0$ and $S_1$->$S_1$, respectively. The state transition in a trellis depends on the current state and a selection criteria for the state transition. Only certain sequence of state-transitions are allowed, and they constitute a valid path. These valid paths are defined by the trellis code. The selection of the state transition for a spectral shaper frame $X_i$ and using a look-ahead depth of D requires spectral shaper frames $X_i, X_{i+1}, \ldots, X_{i+D}$. Therefore, on start-up the binary tree should be filled up to level D to commence state transition assignment. This phase is called the start-up phase. The first state in the trellis is pre-defined and the first state transition thus emanates from that predetermined state. The start-up phase lasts for D spectral shaper frames, and thereafter the system enters into a steady state phase. The state transition selected is one of the two possible state transitions from the current state $S_i$ and the criterion for selection is the metric computed for spectral shaper frame $X_{i+D}$.

For the case of N=2, and M=2, a complete binary tree T can be constructed with the root node being the current state $S_i$. The maximum level of the tree is D+1 where D is the look-ahead depth. There will be a total of $2^{D+1}$ paths and $2^{D+2}-1$ nodes in the binary tree. With every input spectral shaper frame $X_{i+D}$, a new root node is selected and the trellis is extended at level D. Each node at level D has two state transitions emanating from it resulting in a total of $p=2^{D+1}$ nodes at level D+1. The metrics corresponding to each of the p state transitions are computed. These are the branch metrics. The path metrics for the p paths are updated by adding the branch metrics to the accumulated path metrics of nodes at level D. The node at level D+1 which gives the lowest path metric according to a criterion is selected as the best node. The tree is then traversed backwards from selected node to reach the root node. The state transition assignment for the spectral shaper frame $X_i$ is selected to be either the left or right subtree of the root node $R_i$ according to whether the selected node is a left of the left or right subtree of this root. The tree is then updated with the root $R_{i+1}$ being the node connected to $R_i$. The leaves of the new tree so formed are at level D+1. This procedure is continued for every new input spectral shaper frame. The memory requirements for this implementation is $O(2^{D+2}-1)$.

The procedure can be generalised for any trellis code with N states and M state transitions from each state. The tree thus formed will be M-ary and complete. The memory requirements for a lookahead depth D spectral shaper code in this case will be $$O\left(\frac{M^{D+2}-1}{M-1}\right).$$

Figure 3:
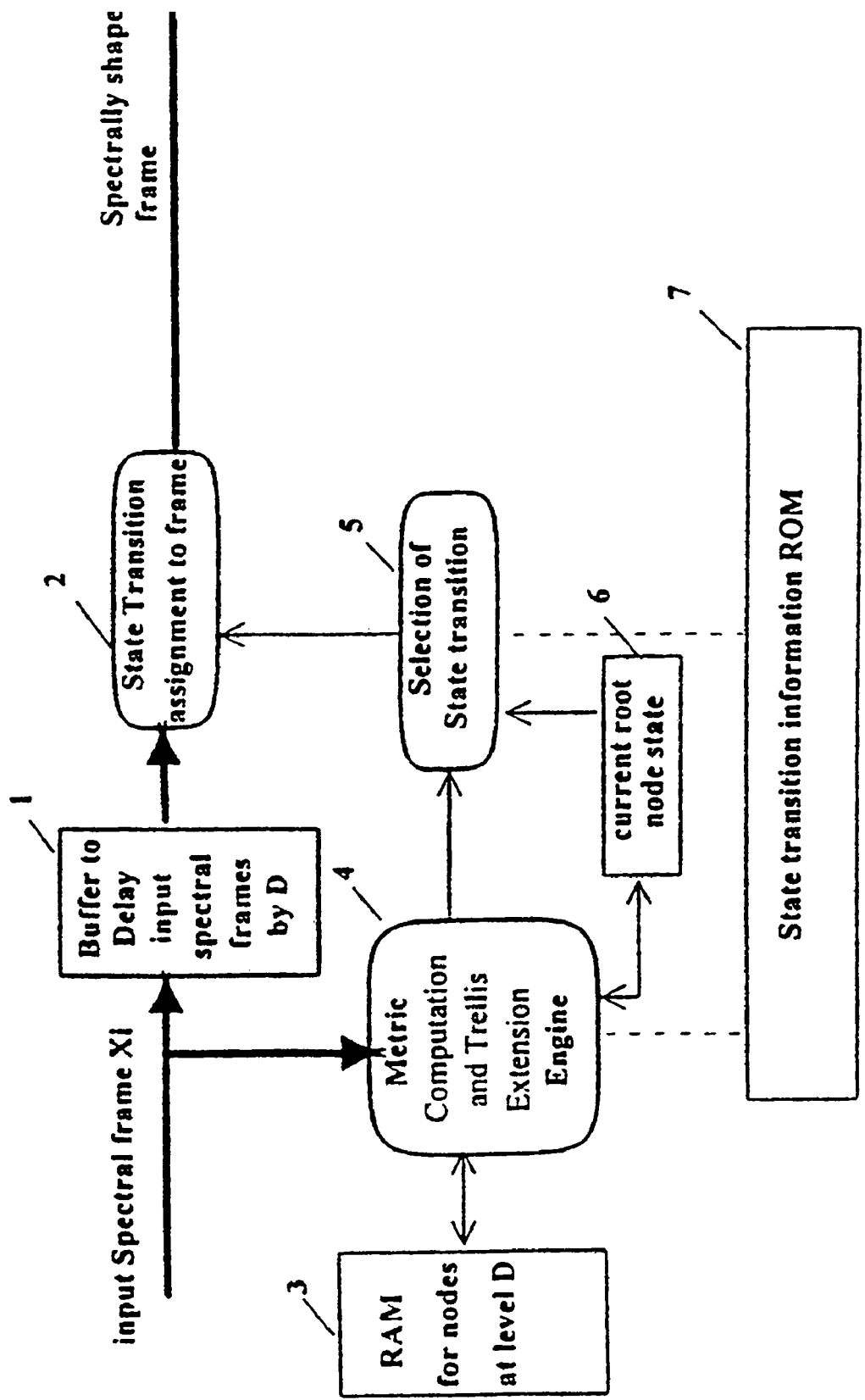
FIG. 3 is an exemplary diagram of design of a trellis based spectral shaper.

FIG. 3 is a block diagram of processing apparatus for implementing the spectral shaping scheme of the preferred embodiment of the present invention. The processing apparatus 9 receives spectral frames $X_i$ as input, and outputs spectrally shaped output frames. The input spectral frames are provided to a delay buffer 1, which delays the input spectral frames by the look-ahead depth D before passing them to a state transition application circuit 2 which applies the spectral shaping and outputs the spectrally shaped output frames. The spectral shaping which is applied by the state transition circuit 2 is determined by spectral shaping processing circuitry on the basis of the input spectral frames over the look-ahead depth. The spectral shaping processing circuitry includes a metric computation and trellis extension engine 4, a node memory RAM 3, a current root node state storage 6, a state transition information ROM 7, and a state transition selector 5. The operation of the processing apparatus 9 is described in greater detail hereinbelow.

The input spectral frame buffer 1 is zeroed at reset. The decision on the state assignment for the first spectral frame is taken only after D spectral frames are input to the delay buffer 1. However all the operations in the preferred embodiment of the present invention are performed as in steady stare. The metric computation and trellis extension engine 4 performs operation as in steady state during the start-up phase (e.g. during the first D spectral frames). This is achieved by assuming that a specific valid trellis path is taken irrespective of the metric computations. This is necessary because the first state in the trellis is predetermined. This predetermined path is used for updating of the next root node state 6 and subsequent updating of the nodes table in node RAM 3. This procedure is carried on till D−1 frames are input to the trellis shaper. The procedure employed during the start-up phase is similar in every respect to that of the steady-state phase except that the root node state 6 is predetermined in the start-up phase.

The $D^{th}$ input spectral frame is stored in the input spectral frame buffer 1. The same frame is input to the metric computation and trellis extension engine 4. The nodes at level D are extended with all possible state transitions emanating from them. The state transition information is read from the state transition information ROM 7. The metrics for all nodes are computed and accumulated to get the path metrics for all possible paths starting from the root node. The path metrics so computed for all the paths emanating from nodes at level D are compared and the one which satisfies the path selection criterion is chosen as the best node at level D+1. The subtree which contains the best node is then chosen and the node RAM 3 is updated with the nodes at level D in the subtree. The current root node state 6 of the trellis is also updated.

The current root node state 6 and the best node at level D+1 computed by the metric computation and trellis extension engine 4 is used to select the state transition between the current root node and the next current root node. The state transition selector 5 receives the state transition information from ROM 7. The state transition information is then applied to the $D^{th}$ previous input spectral frame by the state transition application circuit 2. The resultant frame is the spectrally shaped frame.

Figure 2:
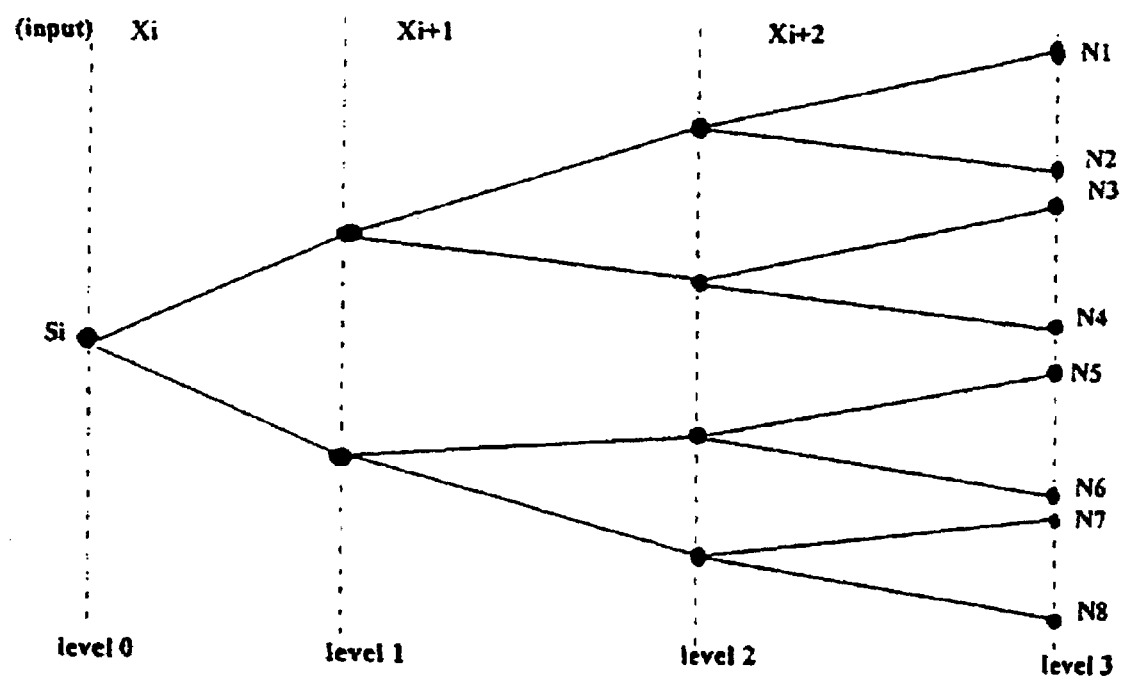
FIG. 2 illustrates a steady state binary tree diagram for a two state trellis based spectral shaping code with look-ahead depth of 3.

As mentioned above, the metric computation and trellis extension engine 4 computes the branch metric for all possible state transitions emanating from nodes at level D. The path metrics starting from the root nodes to all the nodes at level D+1 are accumulated. There is sufficient scratch memory in the metric computation and trellis extension engine 4 and node RAM 3 to hold the temporary node memory for level D+1. After searching for the best path which satisfies the preferred criterion, the sub-tree which contains the best node at level D+1 is stored in node memory 4. The node memory 4 is a linear array of all nodes at level D. For a two state trellis code with two state transitions from each node, FIG. 2 illustrates the steady state tree structure with level D+1 for a look-ahead depth of D=2. The allocation for the nodes in node memory 4 is N1, N2, N3 ..., N8 and in that order. This structure is very efficient because when the best node is computed, it is very easy to locate the subtree (left or right for the binary tree case) to which the best node is connected to. This provides the state transition and the root node for the next iteration.

An example of a trellis based spectral shaping code is illustrated in FIG. 1 for the case of M=2, and N=2, and FIG. 2 is the corresponding steady state representation of the binary tree with look-ahead depth of D=2. During the start-up phase, the trellis state is predetermined to be state $S_0$, for example. The first D−1 spectral shaper frames $X_1$, $X_2$, ..., $X_{D-1}$, are stored in the input frame buffer 1. Each frame is fed to the metric computation and trellis extension engine 4, where the branch and path metrics for all the paths are computed as if in the steady state phase. The node memory 3 is updated such that a fixed trellis path starting from state $S_0$ is followed irrespective of the path metrics and the selection criterion. This is done because complete node information for the whole path is not available until the spectral shaper frame $X_D$ is provided to the metric computation and trellis extension engine 4. The current root node state is also predetermined, according to the selected valid trellis path starting from the predetermined initial state $S_0$.

When the spectral shaper frame $X_D$ is provided to the input buffer 1 and the metric computation and trellis extension engine 4, the steady state phase is reached. The trellis is then extended to level D+1. The branch metrics for all states emanating from nodes at level D are computed and accumulated with the previous path metrics to obtain the total path metrics. For the M=2, N=2 case, for any lookahead depth D≧1, the state transitions at level D+1 will be the state transition a, b, c, d, .... a, b, c, d, and it is not necessary to store this information in state transition information ROM 7. A total of $2^{D+1}$ path metrics are computed for every new input at level D+1. The paths are numbered 1, 2, 3, 4 ... $2^{D+1}$ and are stored linearly in memory the path which satisfies the spectral shaping criterion will be selected as the best path, and the selected path number decides whether the best path is in the left or right subtree. If best path number is less than or equal to $2^D$, then the left subtree is selected, else the right subtree is selected. Knowing the current state and the best node, the current root node state 6 is updated. The metric computation and trellis extension engine 4 updates the node memory 3 with the selected subtree. The state transition for the spectral frame is loaded from state transition ROM 7 using the current root node state. It is then applied to the Dth previous frame to produce the spectrally shaped frame by the state transition application circuit 2.

The above described procedure is followed for every successive spectral shaper frame.

The preferred embodiment of the present invention simplifies the design of the trellis based spectral shaper for variable look-ahead depth and variable spectral frame size. Treating the start-up phase and the steady phase uniformly reduces complexity. It also allows simple linear structures for storage of node information. This results in the effect of reducing design complexity of the trellis based spectral shaper by reducing computational and memory requirements.

As will be appreciated by those skilled in the art from the foregoing description, operating directly in the steady state allows usage of a structure which is not a M-ary tree. The RAM requirements for storing the node information in node memory 3 is $O(M^D)$. The M-ary tree traversing is also circumvented by using the state of the root node for determining the state transition association with the current spectral shaper frame $X_i$. This enables a significant reduction in memory and computational requirements.

The foregoing detailed description of embodiments of the present invention has been presented by way of example only, and is not intended to be considered limiting to the invention as defined in the appended claims.

What is claimed is:

1. A method of coding digital data for transmission according to a trellis coding system having a predetermined number of (N) states and a predetermined number of (M) state transitions from each state, wherein the data is arranged in a series of frames, a state is associated with each frame to determine a coding strategy for the frame, and a look-ahead depth (D) representing a number of data frames is selected, comprising:

assigning an initial state for a first frame of the series of data frames, and assigning states for the subsequent data frames in the series of data frames up to the look-ahead depth according to a predetermined valid trellis path;

sequentially fetching subsequent data frames in the series and determining respective states therefor based on a path metric for state transitions computed over the number of frames represented by the look-ahead depth; and coding the data frames for transmission according to the coding strategies corresponding to the states assigned or determined for the frames, wherein the series of data frames are coded for a shaped spectrum upon transmission thereof.

2. The method of claim 1, wherein fetched data frames are buffered over said look-ahead depth from a current frame $X_i$ to a look-ahead depth frame $X_{i+D}$ where i represents the data frame interval.

3. The method of claim 2, wherein node information for nodes representing possible state transitions at the look-ahead depth are stored in a node memory in an ordered array, and wherein the coding strategy for the current data frame $X_i$ is determined on the basis of a node selected at the look-ahead depth according to said path metric.

4. The method of claim 3, wherein the node information in said node memory is replaced for each new data frame in the series.

5. The method of claim 3, wherein the coding strategy for the current data frame $X_i$ is determined according to a state transition from the state associated with said current frame that is determined by a comparison of the position of the node selected at the look-ahead depth with at least one predetermined threshold.

6. A data encoder for generating spectrally-shaped coded data according to a trellis coding system, wherein the data are arranged in a series of data frames from a data source and a trellis state is associated with each data frame such that a coding scheme for each frame is determined on the basis of transitions of states for frames over a selected look-ahead depth (D) comprising:
- a buffer memory coupled to the data source for buffering data frames in the series of data frames by the selected look-ahead depth (D);
- a metric computation and trellis extension engine coupled to sequentially receive said data frames from the data source and determine node information in a plurality of nodes for each said frame representing possible states, state transitions from a preceding frame, and path metrics for the state transitions;
- a current state storage coupled to the metric computation and trellis extension engine for storing the state of a current frame in the series of data frames;
- a node memory coupled to the metric computation and trellis extension engine for storing said node information for nodes of a frame succeeding the current frame by the look-ahead depth;
- a coding scheme memory for storing a correlation between state transitions and respective coding schemes; and
- a processing circuit coupled to the coding scheme memory and to the metric computation and trellis extension engine for applying a selected coding scheme to a data frame to generate spectrally-shaped coded data;
- said metric computation and trellis extension engine is configured to determine the selected coding scheme for the current frame according to the state stored in the current state storage and a node for the frame succeeding the current frame by the look-ahead depth that is selected on the basis of the path metric for the node,
- the metric computation and trellis extension engine assigning an initial state for a first frame of the series of data frames, and assigning states for the subsequent data frames in the series of data frames up to the look-ahead depth according to a predetermined valid trellis path.

7. The encoder of claim 6 wherein, for the frames within the look-ahead depth of the series of data frames, states and state transitions are assigned according to the predetermined valid trellis path.

8. The encoder of claim 6, wherein for each said data frame received by the metric computation and trellis extension engine the node information in the node memory is replaced with new node information representing the received data frame and the possible state transitions from the preceding data frame.

9. The encoder of claim 8, wherein the node information for the nodes is stored in linear array in said node memory, and wherein the coding scheme for the current frame is determined according to the position of the selected node within the node memory linear array.

10. A data encoder for generating spectrally-shaped coded data according to a trellis coding system wherein the data are arranged in a series of data frames from a data source and a trellis state is associated with each data frame such that a coding scheme for each data frame is determined on the basis of transitions of states for frames over a selected look-ahead depth, the data encoder comprising:
- a metric computation and trellis engine configured to sequentially receive the data frames from the data source and to determine node information in a plurality of nodes for each said data frames representing possible states, state transitions from a preceding data frame, and path metrics for the state transitions, the metric computation and trellis engine configured to assign an initial state for a first frame of the series of data frames, and to assign states for subsequent data frames in the series of data frames up to the look-ahead depth according to a predetermined valid trellis path, and to sequentially fetch subsequent data frames in this series of data frames and to determine respective states therefor based on a path metric for state transitions computed over the number of frames represented by the look-ahead depth; and
- a processing circuit coupled to the metric computation and trellis engine and configured to apply a selected coding strategy to the data frames to generate spectrally-shaped coded data for transmission, the coding strategy is selected on the basis of a node selected at the look-ahead depth according to the path metric.

11. A data encoder for generating spectrally-shaped coded data according to a trellis coding system wherein the data are arranged in a series of data frames from a data source and a trellis state is associated with each data frame such that a coding scheme for each data frame is determined on the basis of transitions of states for frames over a selected look-ahead depth, the data encoder comprising:
- a metric computation and trellis engine configured to sequentially receive the data frames from the data source and to determine node information in a plurality of nodes for each said data frames representing possible states, state transitions from a preceding data frame, and path metrics for the state transitions, the metric computation and trellis engine configured to assign an initial state for a first frame of the series of data frames, and to assign states for subsequent data frames in the series of data frames up to the look-ahead depth according to a predetermined valid trellis path, and to sequentially fetch subsequent data frames in this series of data frames and to determine respective states therefor based on a path metric for state transitions computed over the number of frames represented by the look-ahead depth; and
- a processing circuit coupled to the metric computation and trellis engine and configured to apply a selected coding strategy to the data frames corresponding to the states assigned or determined for the data frames to generate spectrally-shaped coded data for transmission, the coding strategy is selected on the basis of a node selected at the look-ahead depth according to the path metric.

12. A data encoder for generating spectrally-shaped coded data according to a trellis coding system wherein the data are arranged in a series of data frames from a data source and a trellis state is associated with each data frame such that a coding scheme for each data frame is determined on the basis of transitions of states for frames over a selected look-ahead depth, the data encoder comprising:
- a metric computation and trellis engine configured to sequentially receive the data frames from the data source and to determine node information in a plurality of nodes for each said data frames representing possible states, state transitions from a preceding data frame, and path metrics for the state transitions, the metric computation and trellis engine configured to assign an initial state for a first frame of the series of data frames, and to assign states for subsequent data frames in the series of data frames up to the look-ahead depth according to a predetermined valid trellis path, and to sequentially fetch subsequent data frames in this series of data frames and to determine respective states therefor based on a path metric for state transitions computed over the number of frames represented by the look-ahead depth;

a coding scheme memory coupled to the metric computation and trellis engine and configured to store state transition information correlating state transitions to respective coding strategies; and a processing circuit coupled to the metric computation and trellis engine and configured to apply a selected coding strategy to the data frames to generate spectrally-shaped coded data for transmission, the coding strategy is selected on the basis of a node selected at the look-ahead depth according to the path metric.

13. A data encoder for generating spectrally-shaped coded data according to a trellis coding system wherein the data are arranged in a series of data frames from a data source and a trellis state is associated with each data frame such that a coding scheme for each data frame is determined on the basis of transitions of states for frames over a selected look-ahead depth, the data encoder comprising:

a metric computation and trellis engine configured to sequentially receive the data frames from the data source and to determine node information in a plurality of nodes for each said data frames representing possible states, state transitions from a preceding data frame, and path metrics for the state transitions, the metric computation and trellis engine configured to assign an initial state for a first frame of the series of data frames, and to assign states for subsequent data frames in the series of data frames up to the look-ahead depth according to a predetermined valid trellis path, and to sequentially fetch subsequent data frames in this series of data frames and to determine respective states therefor based on a path metric for state transitions computed over the number of frames represented by the look-ahead depth;

a coding scheme memory coupled to the metric computation and trellis engine and configured to store state transition information correlating state transitions to respective coding strategies; and a processing circuit coupled to the metric computation and trellis engine and configured to apply a selected coding strategy to the data frames corresponding to the states assigned or determined for the data frames to generate spectrally-shaped coded data for transmission, the coding strategy is selected on the basis of a node selected at the look-ahead depth according to the path metric.

14. A data encoder for generating spectrally-shaped coded data according to a trellis coding system wherein the data are arranged in a series of data frames from a data source and a trellis state is associated with each data frame such that a coding scheme for each data frame is determined on the basis of transitions of states for frames over a selected look-ahead depth, the data encoder comprising:

a metric computation and trellis engine configured to sequentially receive the data frames from the data source and to determine node information in a plurality of nodes for each said data frames representing possible states, state transitions from a preceding data frame, and path metrics for the state transitions, the metric computation and trellis engine configured to assign an initial state for a first frame of the series of data frames, and to assign states for subsequent data frames in the series of data frames up to the look-ahead depth according to a predetermined valid trellis path, and to sequentially fetch subsequent data frames in this series of data frames and to determine respective states therefor based on a path metric for state transitions computed over the number of frames represented by the look-ahead depth;

a coding scheme memory coupled to the metric computation and trellis engine and configured to store state transition information correlating state transitions to respective coding strategies;

a node memory coupled to the metric computation and trellis engine and configured to store in an ordered array node information representing possible state transitions for nodes of a data frame succeeding the current frame by the look-ahead depth; and a processing circuit coupled to the metric computation and trellis engine and configured to apply a selected coding strategy to the data frames to generate spectrally-shaped coded data for transmission, the coding strategy is selected on the basis of a node selected at the look-ahead depth according to the path metric.

15. A data encoder for generating spectrally-shaped coded data according to a trellis coding system wherein the data are arranged in a series of data frames from a data source and a trellis state is associated with each data frame such that a coding scheme for each data frame is determined on the basis of transitions of states for frames over a selected look-ahead depth, the data encoder comprising:

a metric computation and trellis engine configured to sequentially receive the data frames from the data source and to determine node information in a plurality of nodes for each said data frames representing possible states, state transitions from a preceding data frame, and path metrics for the state transitions, the metric computation and trellis engine configured to assign an initial state for a first frame of the series of data frames, and to assign states for subsequent data frames in the series of data frames up to the look-ahead depth according to a predetermined valid trellis path, and to sequentially fetch subsequent data frames in this series of data frames and to determine respective states therefor based on a path metric for state transitions computed over the number of frames represented by the look-ahead depth;

a coding scheme memory coupled to the metric computation and trellis engine and configured to store state transition information correlating state transitions to respective coding strategies;

a node memory coupled to the metric computation and trellis engine and configured to store in an ordered array node information representing possible state transitions for nodes of a data frame succeeding the current frame by the look-ahead depth; and a processing circuit coupled to the metric computation and trellis engine and configured to apply a selected coding strategy to the data frames corresponding to the states assigned or determined for the data frames to generate spectrally-shaped coded data for transmission, the coding strategy is selected on the basis of a node selected at the look-ahead depth according to the path metric.

* * * * *